Oct. 12, 1965 H. L. DANIELS ETAL 3,212,074
MAGNETIC DISC FILE POSITIONAL INFORMATION APPARATUS
Filed Dec. 15, 1960 2 Sheets-Sheet 1

INVENTORS
HOWARD L. DANIELS
DONALD K. SAMPSON

BY Cushman, Darby & Cushman
ATTORNEYS

MAGNETIC DISC FILE POSITIONAL INFORMATION APPARATUS

Filed Dec. 15, 1960 2 Sheets-Sheet 2

INVENTORS
HOWARD L. DANIELS
DONALD K. SAMPSON

BY Cushman, Darby & Cushman
ATTORNEYS

United States Patent Office 3,212,074

Patented Oct. 12, 1965

3,212,074

MAGNETIC DISC FILE POSITIONAL INFORMATION APPARATUS

Howard L. Daniels, West St. Paul, and Donald K. Sampson, St. Paul, Minn., assignors to Sperry Rand Corporation, New York, N.Y., a corporation of Delaware Filed Dec. 15, 1960, Ser. No. 75,953
17 Claims. (Cl. 340—174.1)

This invention relates in general to positioning apparatus and in particular to apparatus for providing a radial positioning through measurement of a time differential in the circumferential direction.

There are many instances which require one member to be accurately and quickly positioned on a second member. One exemplary instance occurs in the electronic art in the reading out of selected information stored in a memory unit. While the present invention has been applied to such an instance and will therefore be described according to that use, limitation thereto is not intended since there are many other uses, within the scope of this invention, which will become apparent to those of ordinary skill in the art after reading this disclosure.

One form of memory unit use in electronic computers is a random access, magnetic disc file memory which comprises a plurality of rotatable co-axially mounted and equally spaced discs, each having at least one surface formed of magnetically active material. Information is recorded on these surfaces in the form of magnetized spots arranged in concentric bands or tracks, and each disc has the same number of such record tracks with the tracks on each disc having graduated radii of equally increasing magnitude from the innermost to the outermost track.

A plurality of movable magnetic transducers or read-record heads, one for each magnetically active disc surface, are co-axially mounted by respective arms secured to a rotatable shaft such that their axis of rotation is parallel to that of the discs and such that each of the read-record heads is equi-distant from their axis of rotation. It follows, therefore, that the positioning of any one of the read-record heads on a given addressed track of its associated disc must likewise position each of the other read-record heads on their associated discs at the addressed track.

The desired track is addressed by a command from a computer which comprises digital identification of a given track. All of the mechanisms previously employed to control the positioning of a read-record head in response to an address command are subject to faults and disadvantages which are overcome by the present invention.

Briefly described and according to one feature of the present invention, there is provided a means of supplying a position error signal to a positioning servo-mechanism in response to a digital address command. The magnitude of this error signal is recoverable from one of the magnetic discs in the form of a time interval difference between a fixed time interval representing the digital track address and a variable time interval representing the instantaneous position of the read-record head associated with that disc. When these two time intervals are equal, a high quality null indicates that the read-record head is at the addressed position.

One object of this invention is therefore to provide a means for supplying a positional error signal to a positioning mechanism.

Another object of the invention is to provide a means for supplying an error signal, as in the preceding object, representative of a time interval difference between a first variable function and a second fixed function.

Still another object of this invention is to provide a means, as in the preceding object, in the form of a magnetic disc from which the said time interval difference is recoverable.

A further object of this invention is to provide a circuit to record, on a magnetically active disc, signals defining a variable time interval representative of the instantaneous position of a signal reading means.

A still further object of this invention is to provide a circuit which receives the signals defining the fixed and variable time intervals, as in the preceding objects, and produces an output representative of the time difference of said intervals, which output drives a positioning mechanism to reduce said time difference to zero.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings wherein:

The present invention is based on applicants' realization that a digital address command can be represented as a fixed time interval, and on the fact that the radial displacement of a read-record head on a circular magnetic memory disc can be determined through measurement of a time differential or interval in the circumferential direction, where the length of the interval varies in accordance with the degree of radial displacement.

Figure 1:
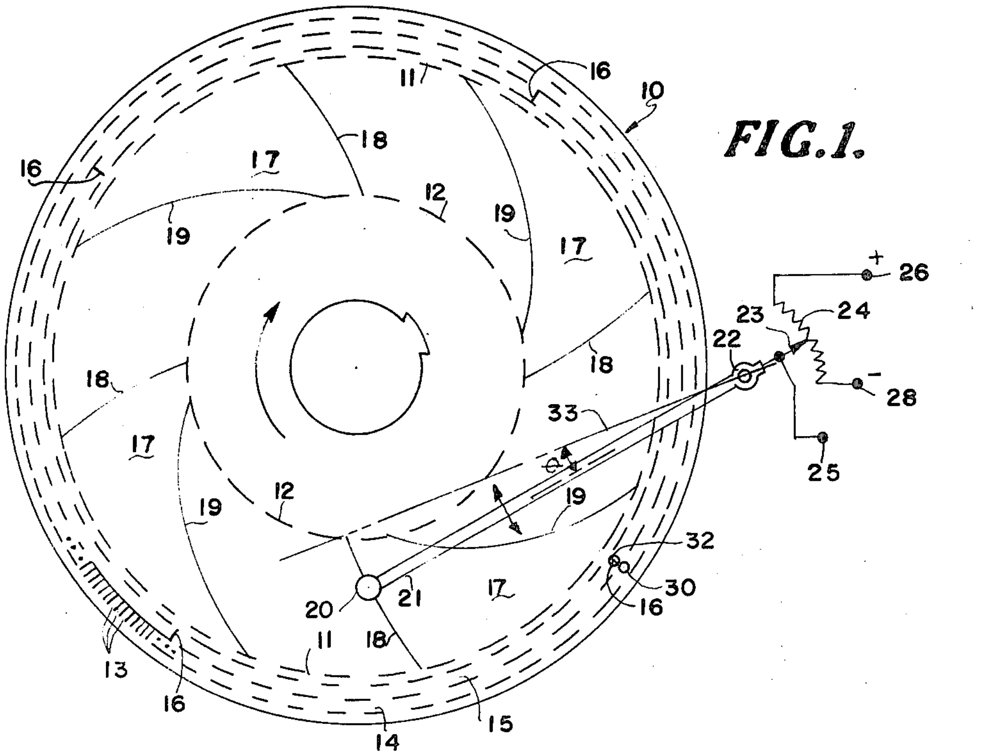
FIGURE 1 is a representation of a positional information disc and its associated read-record heads, according to the invention.

There is shown in FIGURE 1, a rotatable magnetic disc 10 which may be thought of as capable of containing a plurality of concentric circular record tracks (not shown) between dash lines 11 and 12, though the presence of such tracks per se on disc 10 is not essential to this invention, it being necessary only that the surface between lines 11 and 12 is magnetizable. Disc 10 is preferably of the same size as each of a plurality of other discs in a magnetic disc memory file (also not shown) where each of the other discs effectively has, between like lines 11 and 12, a plurality of such concentric circular record tracks with digital information magnetically recorded thereon. By virtue of one or more keyways around its center aperture, disc 10 may be secured to a common shaft carrying the digital information discs for rotation therewith.

Equally spaced magnetic signals such as pulses 13 are recorded completely around an outer track 14 on the illustrated face of disc 10 the other or obverse face of which is not employed in this invention. A second track 15, which is adjacent track 14 on disc 10, contains a plurality (four shown) of magnetic mark or reference pulses 16, there being one such pulse for each of the four sectors which are shown as areas 17 bounded in the circumferential direction by magnetic pulse, mark and track lines 18 and 19, respectively, which will be described in detail later. The number of pulses 13 in track 14 between each two successive mark pulses 16 is equal to the number of could-be circumferential or circular concentric tracks between lines 11 and 12, i.e., to the number of different addressable concentric tracks within like boundaries on one side of any associated information disc in the memory file.

A transducer or magnetic read-record head 20 is carried on arm 21 which is pivotally movable with rotation of shaft 22 by a suitable servo-mechanism, not shown.

Secured to arm 21, or shaft 22 as desired, for movement therewith is tap 23 of potentiometer 24. Output terminal 25 is connected to tap 23 to provide a potential representing the tapped portion of the D.C. voltage connected across the potentiometer terminals 26, 28.

A pair of similar transducers or read-record heads 30 and 32 are fixed in position to read the magnetic pulses in tracks 14 and 15 respectively.

Figure 2:
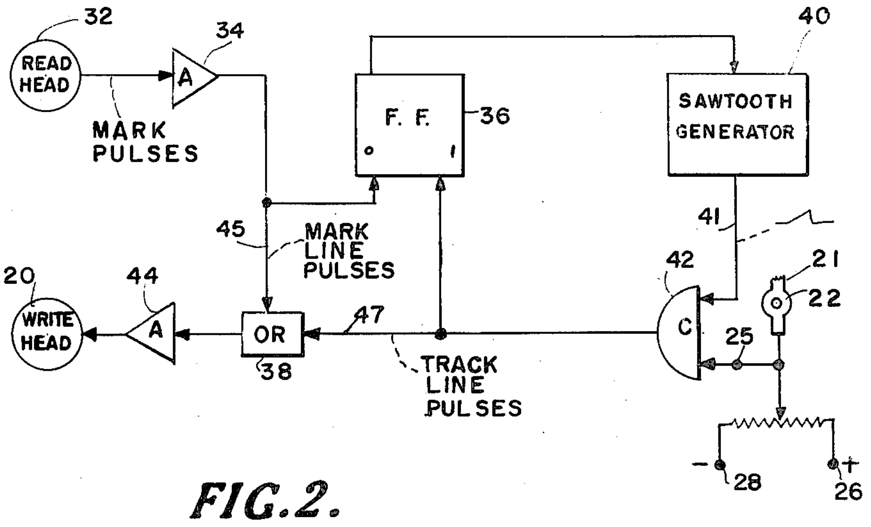
FIGURE 2 is a schematic diagram of a circuit to produce information on the disc of FIGURE 1; and, FIGURE 3 is a schematic diagram of one possible circuit to utilize the positional information produced on the information disc of FIGURE 1.

To generate the mark and track lines 18 and 19 respectively on disc 10, a circuit as represented in FIGURE 2 may be employed. Generation of the closed track of index pulses 13 and the track of mark pulses 16 is entirely similar to conventional generation of timing tracks on magnetic drums and need not be described here. A mark pulse 16 is read by the fixed head 32 and amplified at 34. The output of amplifier 34 is applied to the set-to-0 input of flip-flop 36, and as one input to Or circuit 38. Flip-flop 36 is normally in its 1 state and is triggered to its 0 state on the occurrence of an amplified mark pulse 16. The 0 state output of flip-flop 36 activates a saw-tooth generator 40 which produces a linearly rising output voltage signal on line 41. This output voltage is applied as one input to a comparator 42, which may be of the multiar type for example. A second input is applied to comparator 42 via terminal 25. This second input is the D.C. voltage tapped off potentiometer 24, and is indicative of the instantaneous position of head 20. The output of comparator 42, which is produced upon amplitude coincidence of its two inputs, is applied as a set-to-1 input to flip-flop 36 and as a second input to Or circuit 38. The output of Or circuit 38 triggers a writing amplifier 44 to write a pulse on disc 10 via head 20.

Thus, when head 32 reads a mark pulse 16 as disc 10 is rotated, head 20 writes (1) one of the pulses forming mark line 18 of a given sector 17, and (2) at a delayed time, one of the pulses forming track line 19 of the same sector 17. Since in the specific embodiment of FIGURE 1 there are four mark pulses 16 read by head 32, during each revolution of the disc, there is a total of eight pulses written by head 20, one on each of the four sector 17 boundary lines 18 and 19 being formed. The delay time of writing a pulse on a line 19 is variable in accordance with the angle $\theta$ which arm 21 forms with dashed line 33, which may indicate a normal rest position for arm 21, and therefore, the radial position of head 20. As arm 21 is stepped in minute amounts or moved very slowly across the rotating disc 10, by rotation of shaft 22 in any suitable manner, the voltage from potentiometer 24 varies linearly with the angle $\theta$, thus changing the time at which coincidence occurs between the voltages from generator 40 and potentiometer 24 and thereby changing the time interval between the writing of a pulse on mark line 18 and the corresponding pulse on track line 19. This action is repeated for each sector and each radial displacement of the arm in order to smooth the lines 18 and 19 by forming, for example, a series of superimposed pulses. It may be noted that regardless of the angle $\theta$ mark lines 18 coincide with the arc defined by head 20 as it is drawn across the disc since a mark pulse 16 read by head 32 is rewritten by head 20 at a non-variable later time (instantly if amplifiers 34 and 44 and Or circuit 38, as well as the heads, are considered to give no inherent delay, though a constant amount of inherent or intentional delay may be in that circuit). On the other hand, track lines 19 do not coincide with a head 20 arc since those lines are written by pulses which successively are of different delay times relative to the mark pulse 16 which initiates each of them. In other words, each line 19 has a curvature which is a function of time relative to its associated reference mark pulse 16, whereas lines 18 are not. Lines 19 may be considered as segments of quasi-spirals, while lines 18 are true arcs, with respect to the pivot point of arm 21.

Since arm 21 effectively remains at the same position for any given revolution of disc 10, head 20 practically sweeps out a circle (concentric with circles 11 and 12) which has a given radius on the disc, while it records on that circle a beginning point on each line 18 and an ending point on each line 19 of a radial arc. It will be appreciated that the actual length of each of the four sector arcs on any given circumference between lines 11 and 12, or in other words the arcuate distance between the beginning and ending points of each such arc, is directly proportional to the radius of that circumference, i.e., to the radius of the arc itself. Because of the fact that any of the signal lines 19 diverges (outwardly on the disc) linearly from its associated signal line 18, they define between them an almost infinite number of arcs, or at least a predetermined number equal to the number of track pulses 13 between successive mark pulses 16, each of which arcs is substantially on a different disc circumference, and the length of each such arc bears the same ratio to the radius of the circumference on which it appears as does the length of any other such arc to its circumferential radius.

The voltage supplied to potentiometer 24 through terminals 26 and 28 preferably is variable to enable the ends of each of the track lines 19 to be set to correspond approximately to the first and last of the track pulses 13 associated with each respective sector 17.

The configuration of the disc 10, shown in FIGURE 1, can be varied by increasing or decreasing the number of sectors to provide an acceptable repetition rate of the error signal. However, increasing the number of sectors decreases the sector angle between the mark and track lines 18 and 19 adversely effecting the resolving power in the radial direction. In this case, it might be desirable to generate a separate vernier disc. On such a disc, the face thereof which contains track lines 19 would not include any mark line 18 but would include a greater multiplicity of track lines 19 than a FIGURE 1 type embodiment. These track lines 19 would be written at a greater angular difference from the would-be respective mark lines which would, in this case, not be written on the vernier disc but actually simulated by respective single mark or reference pulses, for example pulses 16, read by a fixed head such as head 32. As an alternative to using such a vernier disc in combination with a disc such as that shown in FIGURE 1 or by itself, a pair of discs which respectively have the mark and track lines 18 and 19 may be employed. Instead of a second disc, the mark lines 18 may be on the opposite side of the same disc on which the track lines 19 appear, and in any case the mark pulses may be employed, instead of the mark lines, as a reference indicator. Where the reference indicator and track line are not to be read by the same head (or heads which are fixedly secured to each other) while the disc means is being used to provide information as to the radial displacement of the head which reads the track lines, the arrangement has the disadvantage of requiring extremely good dimensional stability between the fixed and moveable heads, for example between head 32 and head 20. A suitable compromise of coarse and fine position signal discs would result in the best resolution for a given error signal repetition rate. When forming a vernier positional signal disc, a circuit such as shown in FIGURE 2 could be employed by not applying the output of amplifier 34 to the Or circuit 38 since only the track line 19 is necessary in such a disc.

Since the reference or mark lines 18 of FIGURE 1 would not appear on the vernier type disc just referred to but use is made of a reference or mark pulse 16 instead, that pulse effectively defines the beginning point of each radial arc on the disc, which ends on a line 19 and whose length is proportional by the same factor to its disc radius as any other like ending radial arc is to its disc radius.

Althought the discussion so far concerns the present on a disc or record means, of a reference line 18 or mark pulse 16 which in a time sense precedes the time occurrence of the associated track line 19, it is within the scope of this invention that their time occurrence on the disc or discs be reversed. That is, lines 18 may be "downstream" from their respective lines 19 for example, instead of "upstream" therefrom as in FIGURE 1, since it makes no difference whether the sector arcs swept out by head 20 being at different radial displacements on the disc all begin at the same time or all end at the same time relative to the associated mark pulse, it being only necessary that the beginning and ending points effectively defining each of these arcs are effectively separated a length or distance proportional to the radius of their respective arc. In general, the actual or effective arcs define a plurality of different length lengths (measured arcuately or as chords) all which are similarly proportional in length to their respective displacement from a common reference on the read means, i.e., from the disc center, and each such length extends generally transversely of a respective line (radial line) from the common reference. To make a disc with sectors bounded downstream by a reference line 18 and upstream with a track line 19, the circuit of FIGURE 2 need only be modified to include a delay in line 45 which has a delay time greater than the maximum delay of a pulse occurring on line 47 relative to the sensing of a mark pulse by head 32.

From all the foregoing, it will be appreciated that the sector time interval denoted by the sensing of a reference indicator, such as a mark pulse 16 or the corresponding mark line 18, and the following (or preceding, as in the case just described) sensing of a track line by head 20 on disc 10 rotates in the indicated direction, is proportional to the arm angle $\theta$ which in turn is proportional to the radial displacement of head 20 on disc 10. It follows then, that the time difference between (1) an interval beginning with the sensing of a pulse 16 and ending with the later sensing of a predetermined track-number-representing index pulse 13, and (2) an interval beginning with the sensing of the same mark pulse 16 or its corresponding line 18 and ending with the sensing of the following line 19 by head 20 (or vice versa) is directly proportional indication of the error between the instantaneous arm position and the desired position therefor.

Figure 3:
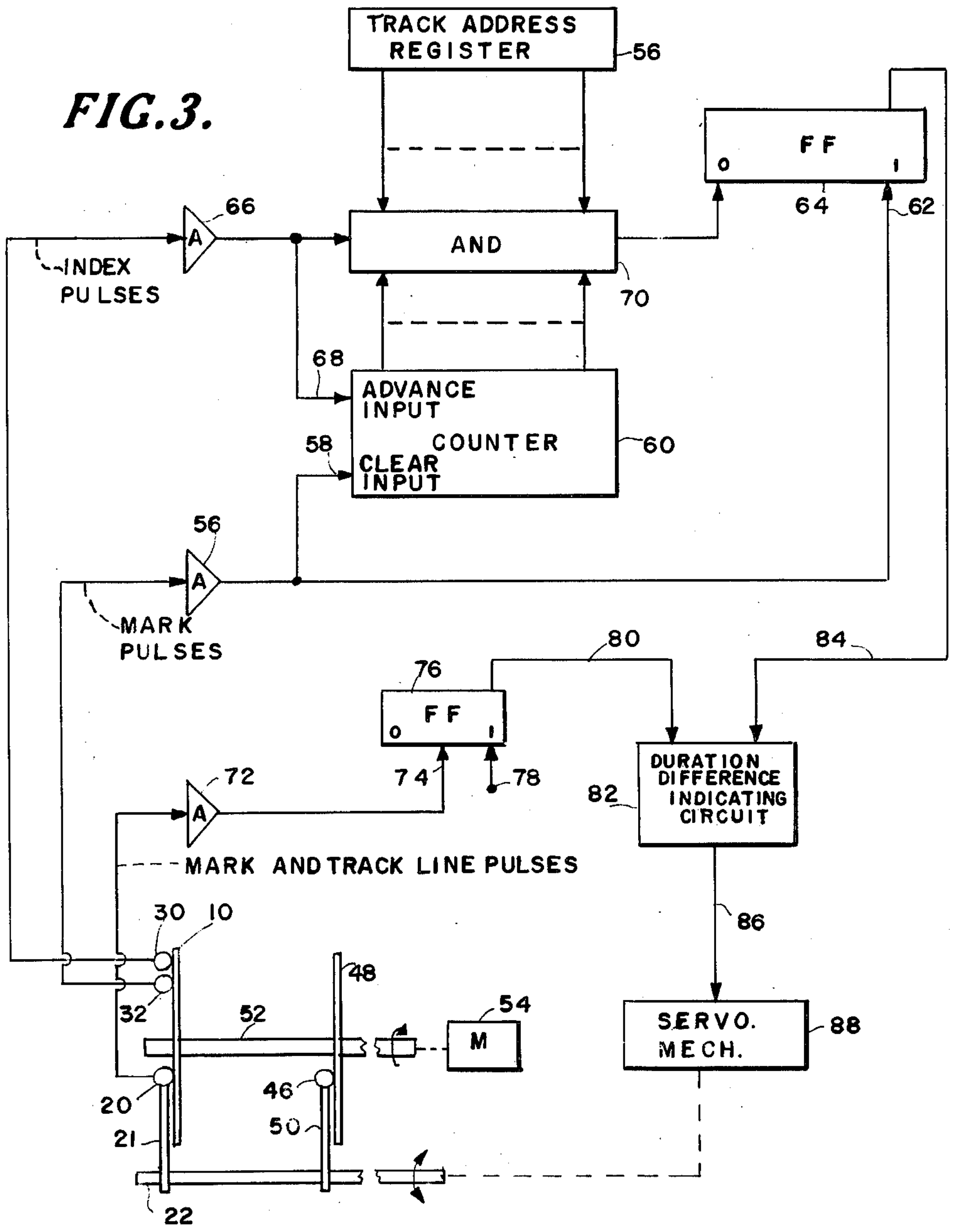

In order to employ the disc 10 of FIGURE 1 as a position signal feedback device, suitable circuitry has been invented to utilize the error signal recoverable from the disc 10. The circuit shown in FIGURE 3 is representative of one possible circuit to utilize the error signal from disc 10 to position the transducing head 20 and at the same time to position the transducing head 46 at the same radial position with respect to disc 48, which may be part of a memory disc file. Heads 20 and 46 are aligned and move together by virtue of the arm 50 of head 46 being secured to shaft 22 at the same angle as arm 21. Both discs 10 and 48 are secured to a mandrel or shaft 52 for rotation by motor 54.

In FIGURE 3, a track address is set up, for example a command from a computer, in a track address register 56, composed of suitable binary elements for example. Mark pulses 16 (shown in FIGURE 1) are read by fixed head 32 in FIGURE 3, amplified at 56, and applied to both the "clear" input 58 of a counter 60 and the set-to-1 input 62 of flip-flop 64, causing that flip-flop to change to its 1 state from a 0 state in which a mark pulse will always find it. At the same time, the index or track pulses 13 (shown in FIGURE 1) are read by fixed head 30 of FIGURE 3, amplified at 66, and applied to the "advance" input 68 of counter 60 and as one input to And circuit 70. The index or track pulses from amplifier 66 advance counter 60, one count per pulse. When the contents of counter 60 equals the contents of the address register 56, And circuit 70 is enabled allowing the next pulse from amplifier 66 to pass through the And circuit to reset flip-flop 64 to its 0 state. The time period or interval during which flip-flop 64 is in the 1 state is therefore proportional to the track address.

As disc 10 rotates, head 20 senses a reference or mark line 18 (FIGURE 1) and then a track line 19, and produces successive mark and track line pulses. In FIGURE 3 these pulses are passed through amplifier 72 to the toggling or center input 74 of flip-flop 76. Before receipt of the first mark line pulse, flip-flop 76 is set to its 1 state by a pulse derived from any suitable source (for example a suitably delayed mark pulse from amplifier 56) and applied to input terminal 78. The first mark line pulse received by flip-flop 76 will therefore toggle that flip-flop to its 0 state causing the leading edge of a signal to be applied over line 80 to one input of a duration difference indicating circuit 82. When head 20 then senses the succeeding track line 19, the resulting pulse switches flip-flop 76 back to its 1 state. The time interval during which flip-flop 76 is in its 0 state is therefore proportional to the arm angle $\theta$ and therefore to the radial displacement of head 20 on disc 10.

Circuit 82 receives at its other input via line 84, the 1 state output of flip-flop 64. As will be appreciated, a pulse derived by head 20 from the reference line 18 occurs at practically the same instant as head 32 reads the associated mark pulse 16 from which line 18 itself was derived, or it may occur at a fixed later time if a built-in delay was included in the circuit for writing line 18. Consequently, the time that flip-flop 76 switches from a 1 to 0 state is fixed relative to the time flip-flop 64 switches from a 0 to 1 state. Any difference in the time occurrence of the leading edges of the respective pulses on lines 80 and 84 may be compensated for in circuit 82 so that that circuit can effectively compare the durations of these two pulses and provide a plus, minus, or zero signal on its output line 86 according to whether the signal on line 80 is longer, shorter, or equal to the duration of the signal on line 84. If equal, the zero signal on line 86 does not cause servomechanism 88 to rotate shaft 22 in either direction. On the other hand, if the duration of the pulse on line 80 does not effectively match the duration of the pulse on line 84, an error signal of proper sign appears on line 86 to cause mechanism 88 to rotate shaft 22 and consequently to servo head 20 in that direction which will tend to make the next pulse on line 80 of closer duration, if not of equal duration, to the pulse then existing on line 84. Accordingly, arm 21 is driven across the surface of disc 10 until the 0 state time interval of flip-flop 76 representing the displacement angle $\theta$ of arm 21 becomes equal to the 1 state time interval of flip-flop 64 representing the track address. When they are equal, head 46 will be accurately positioned to read digital information onto or from the concentric track thereon whose address is that stored in register 56.

The duration difference indicating circuit 82 may take the form of any conventional circuit which can compare the time intervals of two variable length signals and provide an output indicating which is longer or whether they are equal. As exemplary, circuit 82 may include a summing device such as a resistor averaging circuit since the pulses on lines 80 and 84 are of opposite polarity. In such a case, it would be preferable to provide duplicate double-ended clipping or limiting circuits respectively for the inputs to the summing device so that the positive-going voltages of the two pulses are the same and their negative-going voltages are equal. Then, when the two pulses are of equal length, their average will be a certain voltage, which may be considered a zero output signal. (If the zero signal is not actually zero volts, which it will be only if the off level of both pulses is zero volts, then the output of the averaging circuit may be bucked to zero volts if desired.) On the other hand, when the two pulses are not of the same duration, the one which lasts longer will cause, after the other one ends, an output signal which is positive-going or negative-going relative to the zero signal level, according to whether the longer lasting pulse is positive or negative-going relative to the shorter pulse. The output of the summing device may be filtered (integrated) before application via line 86 to the servomechanism to aid in preventing hunting if desired.

Although the foregoing description relative to FIGURE 3 tacitly presumes that head 20 is of the single-gap single-coil type, it may actually have two circumferentially aligned gaps with two respective coils which are respectively coupled to the 0 and 1 set inputs of flip-flop 76 via respective amplifiers. The amplifiers can then be gated by opposite outputs of flip-flop 76 to effectively cancel one of the signals produced by the two gaps upon sensing a line 18 and the other signal upon reading a line 19. A flip-flop and gating arrangement of that sort is effectively the same as that included in the toggle or counter type, center input flip-flop 76 illustrated in FIGURE 3. It should be noted that with two sensing gaps in head 20 providing two separate outputs respectively to the set inputs of flip-flop 76, those inputs basically need not be gated. That is, if the output from the gap which first senses a line 18 is connected to the 1 input, then the output produced by the other (lagging) gap upon sensing that same line 18 switches the flip-flop to its 0 state, and the output from the leading gap then switches it back to 1 upon crossing the succeeding line 19. With this sort of arrangement there is still a similar proportionality factor between the radial position of head 20 and the resulting duration of the 0 state condition of head 20 for all positions of head 20, so that any incorrect positioning of heads 20 and 46 can be accurately corrected.

The present invention, therefore, provides a number of advantages over prior art positioning techniques. One of these is the fact that the quality of information from the feedback disc 10 is not subject to deterioration from mechanical wear as in the case of a potentiometer. Another is that the amplitude of the error signal is particularly insensitive in variation to the power supply voltage. Since the position error producing signals are recorded on the same type of discs as employed in the information section of the disc file, inaccuracies due to differential thermo expansion between the memory disc and a position indicating transducer do not occur. Also, the signals on the discs are generated by electronic means which do not require the mechanical precision required of position transducers, thus providing a more economical system. The present system provides higher resolution and a substantially greater signal to noise ratio than that obtainable with past positioning means.

Thus it is apparent that this invention successfully achieves the various objects and advantages herein set forth.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

We claim:

1. Positional information apparatus comprising a rotatable disc having a magnetizable surface on at least one face with signals recorded on said surface, transducing means, including a reading head disposed to sweep out a substantially radial disc arc when said disc is rotated, for reading recorded signals from said surface, said recorded signals and transducing means being so disposed that when said disc is rotating the transducing means provides a first signal and the said reading head a second signal with the time between said signals being representative of the instantaneous radial position of said reading head.

2. Apparatus as in claim 1 wherein the recorded signals define a reference indicator which is a single pulse on a disc radius different than said arc and said transducing means includes a second reading head for reading that pulse and providing said first signal.

3. Apparatus as in claim 1 wherein the recorded signal defines a reference indicator substantially in the form of a first line crossing any radial disc arc, and a time interval ending indicator substantially in the form of a second line which is downstream from said first line an increasing amount for increasing radii, said reading head being effective to provide said first and second signals respectively from said lines.

4. Positional information apparatus comprising a rotating disc having at least one magnetically active surface; signal means recorded on said surface; and magnetic transducer means mounted to read recorded signals on said surface as said disc rotates; said signal means defining circumferentially variable time intervals representative of the instantaneous radial position of at least a portion of said transducer means.

5. Apparatus as in claim 4 wherein said signal means comprises at least one reference pulse and at least one effective line of pulses; said line of pulses being recorded across said surface such that the time interval between readout of said reference pulse and readout of said line of pulses by said magnetic means is variable and representative of the instantaneous radial position of said transducer means.

6. Apparatus as in claim 4 wherein said signal means comprises at least one effective line of reference pulses and at least one second effective line of pulses; said reference line being recorded independently of the position of said transducer means and said second line of pulses being recorded in accordance with the radial position or said transducer means such that the time interval between readout of said reference line and said second line by said transducer means is variable and representative of the instantaneous radial position of said transducer means.

7. Apparatus for producing a positional information device comprising a rotating disc having a circumferentially and radially extending area of magnetically active material and at least one reference pulse pre-recorded on said disc outside of said area, a first transducing means disposed to readout said reference pulse, a second transducing means including a magnetic writing head, means for moving said second transducing means across said area in a magnetic writing relationship, and circuit means coupled to both said first and second transducing means for producing at least an output pulse which is recorded on said area by said writing head each time said reference pulse is readout by said first transducing means, said first output pulse being produced at a delayed time after said readout, said circuit means including means for varying said time in accordance with the instantaneous radial position of said writing head, the movement of said second transducing means across said area being effective to cause output pulses of different delay times which when recorded form an effective line indicating the end of a plurality of different length time intervals each of which begins substantially with the readout of said reference pulse and represents a different radial distance on said disc.

8. Apparatus as in claim 7, wherein said circuit means also produces a second output pulse which is recorded on said surface by said writing head each time said reference pulse is readout during each revolution of said disc, said second output pulse being produced after said readout at a fixed time which is shorter than any of said delayed times to form an effective reference line across said disc area whereby the time interval measured between substantially equi-radial points on said reference and first mentioned lines is variable and representative of the instantaneous positon of said writing head.

9. Apparatus as in claim 8, wherein said disc has a plurality of circumferentially spaced reference pulses pre-recorded thereon; and wheren said circuit means causes a like plurality of pairs of said lines to be recorded on said surface to form a like plurality of time interval sectors, whereby the resolution of said position indication is improved.

10. Apparatus for writing onto a rotating surface at least one pair of signals whose time interval of occurrence is representative of an instantaneous distance on said surface, comprising said surface, means for rotating said surface, an input terminal for receiving at least one reference pulse as said surface rotates, a writing transducer, first means coupling said input terminal to said transducer for causing writing thereby of a first signal onto said surface as it rotates at a fixed time delay; second means coupling said input terminal to said transducer for causing a second signal to be written on said surface as it rotates at a delay which is proportional to said surface distance and which is longer than said fixed delay, whereby the time interval between occurrence of said first and second signals is variable and which at a given time is representative of the instantaneous value of said surface distance.

11. Apparatus as in claim 10 wherein said surface distance represents the instantaneous position of said transducer on said surface, and wherein said second means includes a source of D.C. voltage, means coupled to both said transducer and said source for tapping off a portion of said voltage corresponding to the instant position of said transducer from a reference position, means for receiving said reference pulse and for producing in response thereto a linear rising output voltage, means for receiving both said linear and said varying voltages and for producing said second output on amplitude coincidence of same, whereby the time interval between said first signal and said second signal depends on the delay time necessary for said linear voltage to reach the amplitude of said varying voltage and therefore said time interval is variable and representative of the instantaneous position of said transducer.

12. Apparatus for providing an error signal to accurately locate a movable element at an addressed position comprising a rotatable positional information device having at least one reference indicator and a plurality of successive position indicators, means for rotating said device, an element movable to any one of a plurality of different positions corresponding to said position indicators respectively, means for moving sail element, means for sensing said reference indicator and a predetermined one of said position indicators for providing during rotation of said device signals defining a time interval representing a desired positional address for said element, means cooperating with said sensing means for determining during rotation of said device the time interval effectively between said reference indicator and the one of the positional indicators which corresponds to the instantaneous position of said element, and means for comparing the duration of said time intervals to provide an error signal for causing said moving means to move said element in that direction which tends to equate the duration of said intervals.

13. Apparatus for providing an error signal to accurately locate a movable element at an addressed position comprising a rotating positional information device provided with information representing a plurality of radial positions on said device, said information being of two forms, one located on a circular path at one radius and variable in fixed increments along said path and the other located at least on a plurality of other circular paths at different radii and variable in fixed increments from one of said other paths to the next successive one of said other paths, first means for selecting one value of said one form of information which value represents a desired radial position and for producing in response thereto a time interval of fixed length, transducer means including a reading head for reading said other form of information which then represents the instantaneous radial position of said reading head, means for moving said reading head across said other paths, means coupled to said transducer means for producing signals representing a time interval which is progressively variable in length as said reading head is moved across said device; and means for comparing the duration of said fixed and variable time intervals for producing an output signal to cause said moving means to drive said reading head across said device in that direction which tends to equate said variable time interval to said fixed time interval, whereby said reading head is accurately positioned at the said desired radial position on said device.

14. Apparatus as in claim 13 wherein said information device comprises a rotating disc at least one surface of which is formed of magnetically active material with said one form of information comprising a closed track of a plurality of equally spaced pre-recorded track pulses and at least one mark pulse pre-recorded on a second track such that the time intervals between said mark pulse and sequential ones of said track pulses are each representative of a different radial position on said disc, wherein said first means includes a fixed pair of transducers positioned such that one reads the track containing said mark pulse and the other reads the track containing said track pulses, and wherein said other form of information comprises at least a plurality of pulses pre-recorded effectively in a line on said surface, respectively different radial positions such that the time interval between reading of said mark pulse and the reading of said line by said reading head varies with the instantaneous radial position of said reading head.

15. Apparatus as in claim 14, wherein said first means further includes a register means for holding a particular track address command; a counter coupled to receive the mark pulse transducer output to clear its contents and to receive the track pulse transducer output to advance its count, an And circuit coupled to receive the outputs of said counter, said register and said track pulse transducer, said And circuit being enabled when the contents of said counter and said register are equal to pass the next appearing track pulse; and a first bistable circuit coupled to receive as its two-state switching inputs the said mark pulse and the said passed track pulse, said bistable circuit producing an output in the interval between receipt of said mark pulse and said passed track pulse, whereby said output is in the form of a fixed time interval representative of a particular addressed track and therefore radial displacement on said surface.

16. Apparatus as in claim 15 comprising a second bistable circuit of the counter type which is coupled to receive the output of said reading head and effectively the mark pulse transducer output as its inputs to produce an output beginning with the effective receipt of said mark pulse and ending with the subsequent receipt of one of said plurality of pulses for defining said variable time interval.

17. Apparatus as in claim 16, wherein said other form of information comprises a plurality of pairs of pulses, each pair being pre-recorded on said surface at a different radial location and each pair being circumferentially spaced by progressively increasing amounts as said radial locations progress outwardly such that each of said circumferential spacings represents a different radial location on said surface, the first pulse of each pair being recorded in a fixed constant relationship with said mark pulse, wherein said reading head reads both pulses of each pair in sequence, and wherein said second bistable circuit receives said pulses of each pair in sequence, whereby its output defines said variable time interval as representative of the circumferential spacing between the pulses of each pair or the radial position of each pair of pulses and therefore the radial displacement of said reading head.

References Cited by the Examiner

UNITED STATES PATENTS

| | | | |
|---|---|---|---|
| 2,733,425 | 1/56 | Williams et al. | 340—174.1 |
| 3,007,144 | 10/61 | Hagopian | 340—174.1 |
| 3,034,111 | 5/62 | Hoagland et al. | 340—174.1 |
| 3,126,535 | 3/64 | Streeter | 340—174.1 |

IRVING L. SRAGOW, *Primary Examiner.*